United States Patent [19]

Latapie

[11] 4,301,778
[45] Nov. 24, 1981

[54] ELECTRONIC IGNITION DEVICE

[75] Inventor: Jean-François Latapie, Roquettes, France

[73] Assignee: Equipements Automobiles Marchal, Issy-les-Moulineaux, France

[21] Appl. No.: 108,781

[22] Filed: Dec. 31, 1979

[30] Foreign Application Priority Data

Jan. 12, 1979 [FR] France .................................. 79 00749

[51] Int. Cl.³ .............................................. F02P 5/04
[52] U.S. Cl. ................................... 123/426; 123/415; 123/614
[58] Field of Search ............... 123/614, 650, 651, 415, 123/426

[56] References Cited

U.S. PATENT DOCUMENTS

| 3,853,103 | 12/1974 | Wahl et al. | 123/415 |
| 4,015,566 | 4/1977 | Wahl | 123/415 |
| 4,102,311 | 7/1978 | Crall et al. | 123/415 |
| 4,156,411 | 5/1979 | Crall et al. | 123/415 |
| 4,257,373 | 3/1981 | McDougal et al. | 123/426 |

FOREIGN PATENT DOCUMENTS 2440275  3/1976  Fed. Rep. of Germany ...... 123/426

Primary Examiner—P. S. Lall
Attorney, Agent, or Firm—Brisebois & Kruger

[57] ABSTRACT

An electronic ignition device for use with an internal combustion engine is coupled between an ignition coil switch and a magnetic pick-up. The pick-up produces a cyclical signal A which is integrated and applied to a first comparator, the other input of which receives a threshold. The comparator output actuates the ignition coil switch. A logic circuit combines the output Z of a zero detector receiving the cyclical signal A with the output of the first comparator. The logic circuit output is integrated to provide a signal R indicative of actual ignition displacement, and which is compared with a signal RS representing the required ignition displacement. In a first embodiment this comparison takes place in a second comparator the output of which is fed back to constitute the threshold input of the first comparator. In a second embodiment the threshold for the first comparator is defined by RS, the signals R and I being combined before application to the first comparator. By means of such control loop variations due to manufacturing tolerances, etc, will not adversely affect spark retardation.

9 Claims, 6 Drawing Figures

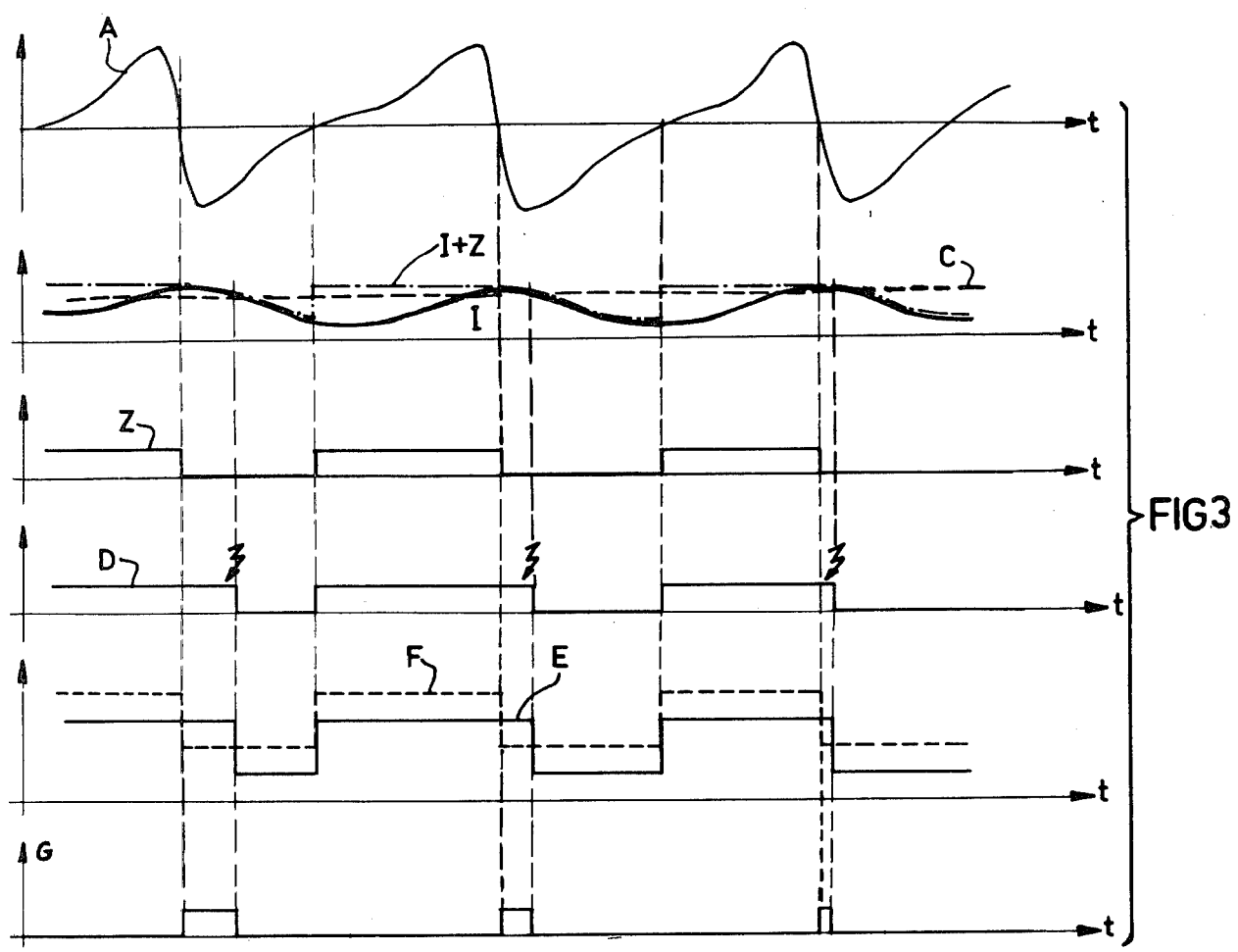

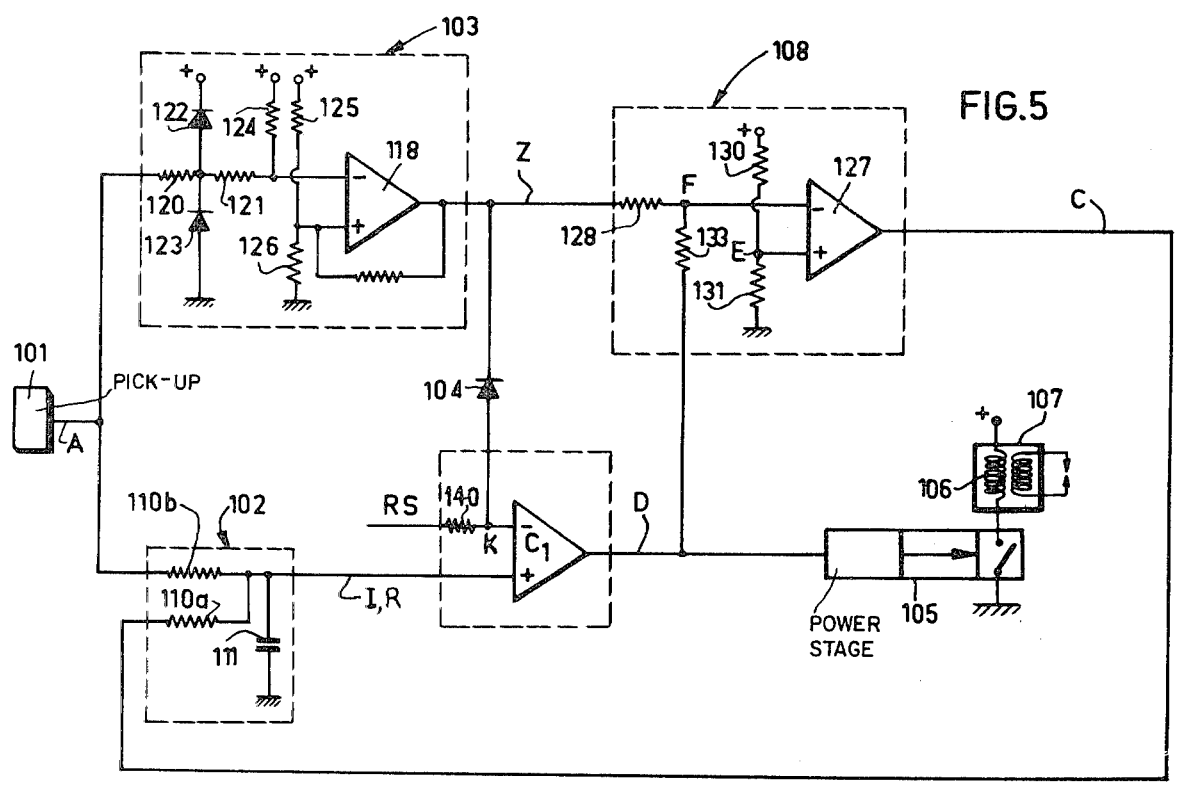

ELECTRONIC IGNITION DEVICE

BACKGROUND OF THE INVENTION

The present invention relates to an electronic ignition device for use, in particular, with the internal combustion engines of motor vehicles. This device comprises, in association with a device of the conventional type enabling ignition to be advanced as a function of the speed of rotation of the engine, a circuit by means of which ignition can be retarded as required at any stage of operation, i.e. whatever the speed of rotation of the engine. In other words, the electronic ignition device enables ignition to be retarded by the application of an electrical signal, retardation being superposed upon the conventional ignition advance at any point along the advance curve.

It is in fact known that, to achieve optimum performance in internal combustion engines, it may be necessary to take into account a large number of operational parameters such as, for example, outside temperature, temperature of the exhaust gases, temperature of the cooling water, the occurrence of "pinking", the level of the vacuum in the admission manifold, so that consequently, on the basis of the advance curve that enables a conventional advance device to be obtained, it may be felt desirable to modify the ignition advance angle. In general, monitoring of the parameters that have to be taken into account takes the form of an electrical signal, the value of which determines the extent of the correction to be made to the ignition advance. The purpose of the invention is to provide an electronic device which, on the basis of a voltage level constituting the signal, enables ignition retardation of a predetermined value to be obtained, that is to say ignition retardation which is neither a function of the speed of rotation of the engine at the moment of correction, nor a function of the manufacturing tolerances of the various elements that are used to form the ignition device. More particularly, the invention relates to an ignition device which uses a magnetic pick-up, the coil of which delivers a periodical alternating signal, ignition being started at the moment when the voltage supplied by the pick-up passes through zero in a zone of rapid change.

In the ignition devices of this type, which are well-known in the state of the art, use is generally made of a permanent magnet which generates a magnetic field, said magnet generating a magnetic flux in a magnetic circuit into which is introduced a cam rigidly connected to the ignition device, the fixed part of the magnetic circuit being separated from the above-mentioned cam by at least one air-gap; an electromagnetic coil surrounds a part of the magnetic circuit and receives at its terminals a voltage induced by the changes in the flux in the circuit. It is known that the induced voltage furnished by such a pick-up is proportional to the rate of change in the flux, so that the signal obtained has a form and amplitude which are a function of the speed of rotation of the spindle. It has already been proposed, in French Pat. No. 2.230.967, to associate, with such a pick-up, an integrator for obtaining a signal, the shape of which no longer depends upon speed of rotation of the spindle of the ignition device. A further purpose of the invention is to provide a means which uses a magnetic pick-up associated with such an integrator, as described in French Pat. No. 2.230.967.

It is clear that if the output signal from an integrator circuit associated with a magnetic pick-up as defined above is compared with a voltage threshold of predetermined value, it is possible to define an ignition displacement of predetermined amplitude independently of the speed of rotation of the ignition device and, therefore, of the engine. However, for a given comparison threshold, the ignition angle displacement will clearly be a function of the signal furnished by the pick-up and its associated integrator, that is to say the ignition angle displacement will not be capable of being precisely fixed, and this is very disadvantageous when the motor is required to function to give optimum performance, as well as when the aim is to reduce and to effect a saving in energy. Another object of the invention is to provide an electronic means whereby the ignition displacement which is achieved with, on the one hand, a magnetic pick-up associated with an integrator, and, on the other, a signal having a given voltage level, can be rendered independent of manufacturing tolerances.

SUMMARY OF THE INVENTION

According to the invention, this object is attained by comparing a representation of the ignition displacement that is actually obtained, with a representation of the required ignition displacement, and by acting, through a correction circuit and as a function of the difference between two representations on one of the comparator inputs which receives the signal from the magnetic pick-up and the comparison threshold defining the ignition displacement. According to the invention, a control loop is formed which enables the ignition displacement to be rendered independent of the manufacturing tolerances affecting the ignition device.

The invention consequently provides a new industrial product which consists of an ignition device, particularly for the internal combustion engines of motor vehicles, and comprising at least one ignition coil switch and a magnetic pick-up which produces a periodical alternating signal A and is associated with an integrator circuit which processes said alternating signal, the output signal I of said integrator circuit being fed to an input of a comparator $C_1$, the other input receiving a signal defining a threshold, and the output of the comparator being used to actuate the ignition coil switch, which ignition device is characterized in that it comprises a logic circuit combining, on the one hand, the signal Z furnished by a zero detector indicating that the signal A has reached a value of approximately zero and, on the other hand, the output signal of the comparator $C_1$, the output from the logic circuit being passed to an integrator to provide a signal R which constitutes a measure of the ignition displacement achieved, the result of the comparison of the signal R with a signal RS, which represents the required ignition displacement, causing said switch to be actuated.

In a first variant, an amplifying comparator $C_2$ receives, on the one hand, the signal R and, on the other, the voltage RS representing the required ignition displacement for furnishing a correction signal C defining said threshold.

In a second variant, the signal defining said threshold is the voltage RS representing the required ignition displacement, the signal R being combined with the signal I.

In the two above-mentioned variants, the signal Z may be advantageously combined with the signal I for supply to an input of the comparator $C_1$; the signal Z may also be combined with the signal defining the threshold for supplying an input of the comparator $C_1$.

In the case of the first variant, the signal Z may be combined with the signal I by means of a direct-coupled diode, to supply the positive input of the comparator $C_1$, the negative input receiving the correction signal C, and the logic circuit being of the "exclusive OR" type.

In the case of the second variant, the signal Z may be combined with the signal defining a threshold, dependent upon the required ignition displacement, by means of an inversely coupled diode, so as to supply the negative input of the comparator $C_1$, the positive input receiving the signal I and the signal R, and the logic circuit being of the "NOT AND" type; the integrator supplying the signal I and the integrator supplying the signal R may be one and the same.

In the conventional manner, the output of the comparator $C_1$ may control the opening and closing of the supply circuit for the ignition coil by means of Darlington-connected transistors—the start of the time during which the ignition coil is charged can be determined in the known manner so as to store a constant energy in the coil or to charge the coil during part of a constant period, as proposed in French Pat. No. 2,357,108.

BRIEF DESCRIPTION OF THE DRAWINGS

To enable the subject-matter of the invention to be better understood, two embodiments, illustrated in the attached drawings, will now be described simply as non-limiting examples.

In these drawings:

FIG. 3 illustrates the variation in the voltages at different points of the circuit of FIGS. 1 and 2, as a function of time;

FIG. 5 shows, in detail, one form of the FIG. 4 arrangement; and

DETAILED DESCRIPTION OF THE PREFERRED EMBODIMENTS

Figure 1:
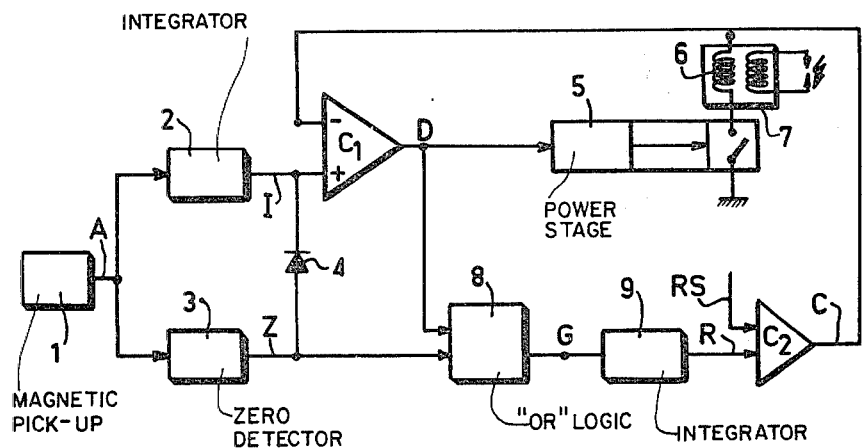
FIG. 1 is the block diagram illustrating one form of the first variant of the invention.
Figure 2:
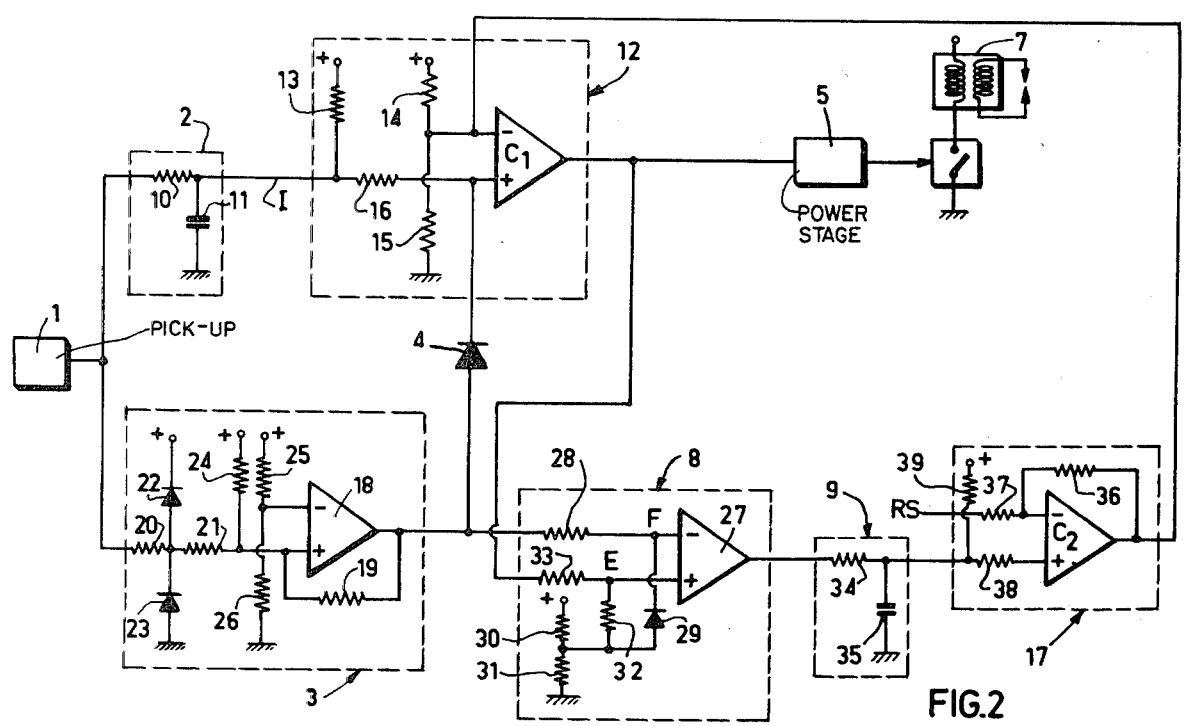
FIG. 2 shows, in detail, one form of the FIG. 1 arrangement.

Referring to FIGS. 1 to 3, it will be seen that the ignition device of the first variant of the invention comprises a magnetic pick-up 1 which supplies a periodical alternating signal A, which is illustrated by the first line in FIG. 3. It is known that the shape and amplitude of this signal are functions of the speed of rotation of the ignition means in which the magnetic pick-up 1 is provided, i.e. a function of the speed or rotation of the associated internal combustion engine. As described in French Pat. No. 2.230.967, the pick-up 1 is associated with an integrator 2 which receives the signal A and converts it into a signal I, the shape of which is independent of the speed of rotation of the motor. The change in the signal I with time is illustrated by the second line in FIG. 3. The magnetic pick-up 1 also supplied a zero detector 3, which provides a signal Z having a value of 1 if the signal A is positive, and a zero value if the signal A is negative; the signal Z is illustrated by the third line of FIG. 3. The signal Z is added to the signal I by means of a diode 4, this sum constituting a signal (I+Z), which is shown in dot-dash lines along the second line in FIG. 3. The signal (I+Z) is applied to the positive input of a comparator $C_1$, the negative input of which is supplied in the manner to be described hereinafter, and the output of which controls a power stage 5 formed by Darlington-connected transistors. The power stage 5 controls the opening and closing of the supply path of the primary winding 6 of the ignition coil 7 of the motor vehicle.

The signal Z and the output signal from the comparator $C_1$ are passed to a logic circuit 8 performing the "exclusive OR" function. The logic circuit 8 supplies an integrator 9, the output of which is a signal R passed to one of the inputs of an amplifying comparator $C_2$. The other input of $C_2$ receives a voltage RS which represents the ignition retardation that it is required to apply with regard to the signal supplied by the pick-up 1. The amplifying comparator $C_2$ provides, at its output, a correction signal C, which is a linear function of the difference existing between the signals R and RS; the signal C is shown in broken lines along the second line in FIG. 3. The signal C is applied to the negative input of the compartor $C_1$.

The signal RS is a voltage representing the required retardation. The signal R is a voltage representing the retardation actually achieved: in effect, the logic circuit 8 provides a signal at G which begins at the descending leading edge of the signal Z and ends at the descending leading edge of the signal D provided by the comparator $C_1$; the signal supplied at point G of the system is illustrated on the last line of FIG. 3. The duration of this signal at G thus corresponds closely to the ignition retardation achieved and, consequently, the signal R at the output of the integrator 9 is a good measure of the retardation achieved. The amplifying comparator $C_2$ then supplies a correction signal if the retardation achieved increases in relation to the required retardation. The correction signal C increases so that, on the second line of FIG. 3, the intersection of the curve C and the curve (I+Z) occurs earlier after the signal A has passed through zero, this corresponding closely to the reduction in ignition retardation that is achieved.

It will thus be seen that the device in accordance with the invention comprises loop arrangement running to the comparator $C_1$ and bringing into operation a correction signal which enables a voltage representing the retardation achieved to be compared with a voltage representing the required retardation, so that manufacturing tolerances affecting the ignition means and the corresponding magnetic pick-up can be ignored.

FIG. 2 illustrates in detail an electronic circuit which may form the arrangement shown in FIG. 1. The integrator 2 comprises a resistor 10 which receives the signal A and the output of which is connected to earth by a capacitor 11. The signal I from the integrator 2 is passed into a unit 12 which comprises the comparator $C_1$. The signal I is passed to the positive input of the comparator $C_1$ by way of a resistor 16, the voltage at this input being increased by means of the resistor 13, which is connected to the positive of the electric supply. In the same way, the negative input of the comparator $C_1$ is increased in voltage with the help of the dividing bridge formed by the two resistors 14 and 15 connected between earth and the positive supply. The negative input of the comparator $C_1$ receives the output from the amplifying comparator arrangement 17. The output from the comparator $C_1$ is fed to the power stage 5 which controls the supply to the coil 7.

The pick-up 1 also supplies a zero detector 3 constituted by an amplifying comparator 18, the positive input of which is connected to the output by a resistor 19. The positive input of the comparator 18 has two resistors 20 and 21, the junction point of which is connected, on the one hand, to the positive supply and, on the other hand, to earth by two trimming diodes 22 and 23. The average voltage of the positive terminal is increased by means of the resistor 24 connected to the positive terminal, and the average voltage of the negative terminal is increased by means of a dividing bridge constituted by the two resistors 25 and 26 connected respectively to the positive supply and to earth. The output of the zero detector 3 is connected to the positive input of the comparator $C_1$ by the diode 4.

The signals from the comparator $C_1$ and from the zero detector 3 are passed into a logic circuit 8, which comprises a comparator 27. The negative input F of the comparator 25 is connected to the zero detector by a resistor 28. If V is the voltage of the positive supply, the voltage at F can assume a value only of V or V/2, since F is connected through a diode 29 on the one hand, to a dividing bridge constituted by two equal resistors 30 and 31 connected respective to the positive supply and to earth and, on the other hand, to the positive terminal E of the comparator 27 by a resistor 32 having the same rating as the resistor 33 which is interposed between the terminal E and the output of the comparator $C_1$. Similarly, the signal at the terminal E can assume a value of only V/4 or 3V/4. The voltages at the points E and F are illustrated by the solid line and the broken line respectively along the fifth line of FIG. 3.

The output from the logic circuit 8 is passed to an integrator 9 comprising a resistor 34, the output of which is connected to earth through a capacitor 35. The amplifying comparator unit 17 is constituted by an amplifier $C_2$, the negative input of which is connected to the output by a resistor 36. The negative input receives, by way of the resistor 37, a signal RS while the positive input receives, by way of the resistor 38, the signal coming from the integrator 9. The potential of the positive terminal is increased by means of the resistor 39 which is connected to the positive supply.

The mode of operation of the circuit just described in detail has been previously explained. This circuit thus enables retardation to be achieved independently of the speed of rotation of the engine and of the constructional features of the ignition means and the magnetic pick-up.

Figure 4:
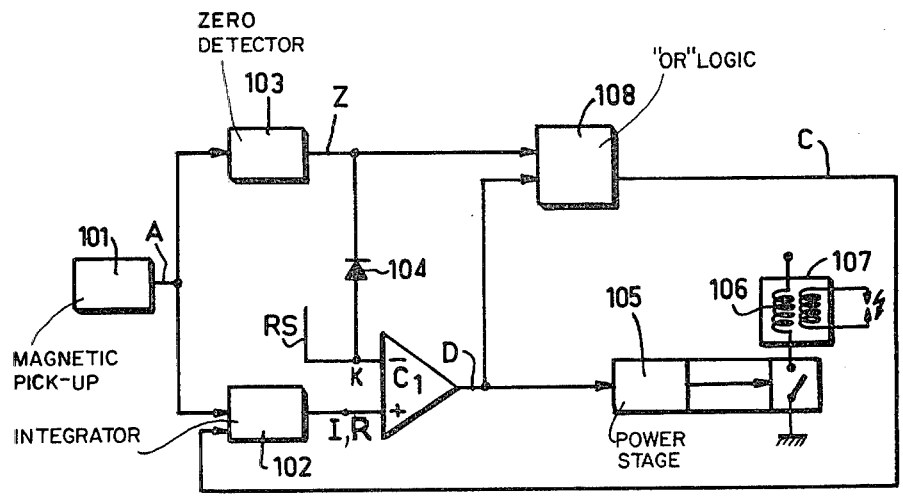
FIG. 4 is the block diagram of an arrangement in accordance with the second variant of the invention.
Figure 6:
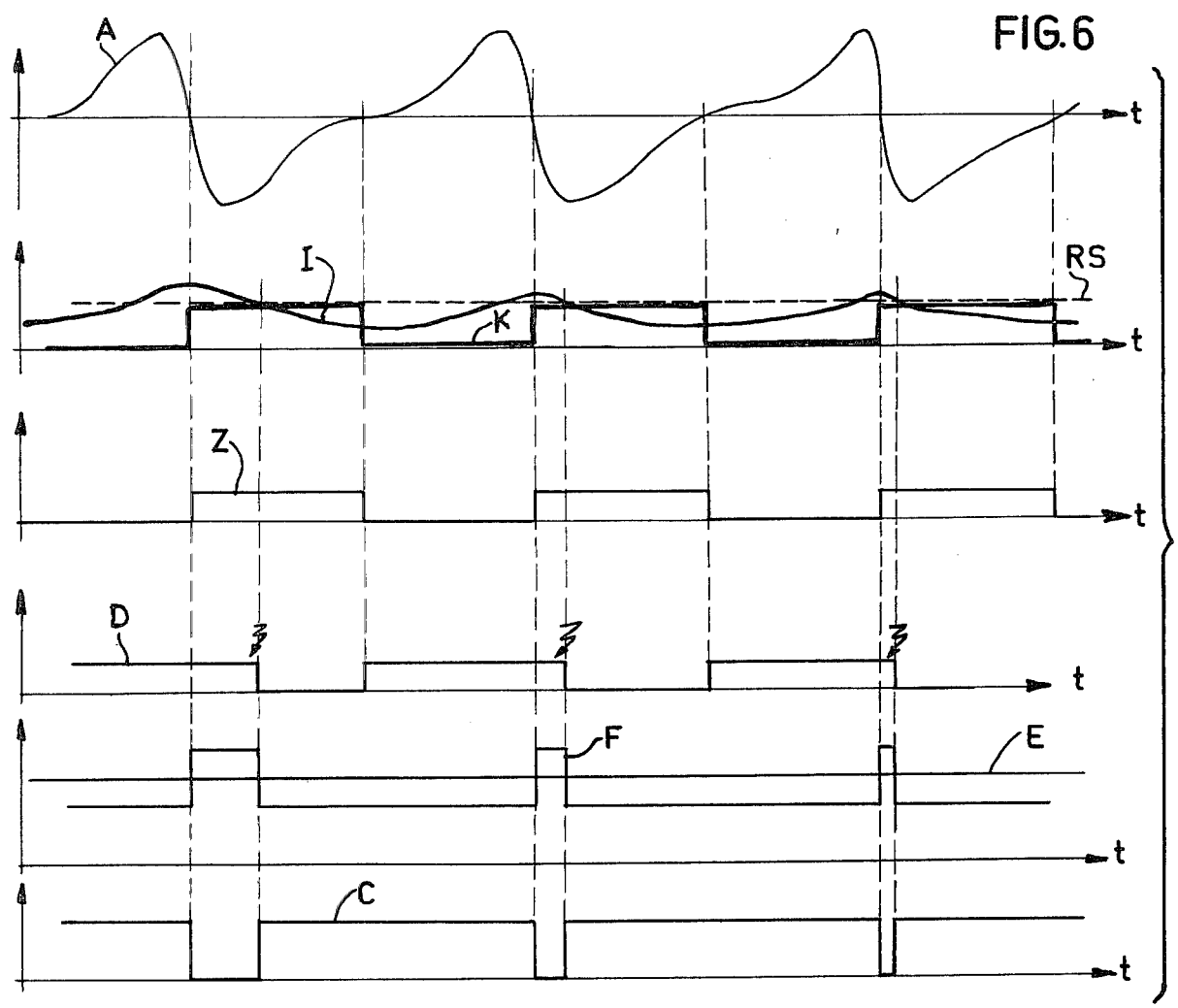
FIG. 6 illustrates the variations in voltage at different points of the FIG. 5 circuit, as a function of time.

Referring now to FIGS. 4 to 6, a form of the second variant in accordance with the invention will now be described. In a general manner and for the purpose of simplifying the description, the components of the second variant of the device have been allotted the same reference numerals, increased by 100, as those used for designating similar components in the first variant of the device.

In the block diagram of FIG. 4, it will be seen that this device comprises a magnetic pick-up 101, which supplies an integrator 102 and a zero detector 103. Apart from the signal A produced by the magnetic pick-up 101 (illustrated on the first line of FIG. 6), the integrator 102 receives a correction signal C, the method of generation of which will be indicated later. The output of the integrator 102 is formed by a signal I which is passed to the positive terminal of a comparator $C_1$, the negative terminal K of which receives, by way of a resistor 140, a voltage RS which represents the required retardation; the voltage RS is combined with the signal Z (shown on the third line of FIG. 6) provided by the zero detector 103 by means of a diode 104. The voltage at the terminal K has the value RS when Z is not zero, and the value O when Z is zero; this voltage is illustrated on the second line of FIG. 6, as is the signal I which is compared therewith. The output from the comparator $C_1$ controls a power stage 105, which is constituted by transistors in a Darlington arrangement and which forms a circuit-breaker for cutting off the supply to the primary winding 106 of the coil 107. Like the output signal D from the comparator $C_1$, the signal Z is passed to a logic circuit 108 which provides the correction signal C which is passed to the input of the integrator 102. The signals D and C are illustrated on the fourth and sixth lines respectively of FIG. 6.

FIG. 5 illustrates a practical detailed form of the FIG. 4 block diagram. The pick-up 101 passes the signal A to the zero detector 103, which is of substantially the same construction as the zero detector 3 which was described in connexion with the first variant. Thus, the detector 103 comprises an amplifying comparator 118, the negative and positive terminals of which are brought to relatively high average voltages by being connected to the positive supply and to earth by means of the resistors 124 and 125, 126 respectively. The negative terminal is supplied by way of two resistors 120, 121 in series, between which are connected two diodes 122, 123, which connect the junction of the resistors 120 and 121 to the positive supply and to earth respectively. Compared with the first variant the inputs of the comparator 118 have been inverted so as to obtain at the output of the comparator $C_1$ a signal having the same form as that obtained in the first variant.

It has been stated that the correction signal C is passed by way of the integrator 102 to the positive input of the comparator $C_1$. This arrangement shows that, compared with the first variant, the terminals of the comparator have been reversed so that the correction signal will no longer be proportional to the retardation, but the complement thereof, since it is required to obtain, at the output of $C_1$, a signal similar to that obtained in the first variant. To obtain this correction signal C, the signal Z and the output signal D from the comparator $C_1$ are compared with the aid of a "NO AND" logic circuit designated as a whole by the reference numeral 108. The logic circuit 108 is formed by a comparator 127, the output terminal E of which is brought to a voltage 3 V/4 (V being the positive supply voltage) by means of the dividing bridge formed by the resistors 130 and 131. The negative terminal F of the comparator 127 receives the signal Z by way of the resistor 120, and the signal D by way of the resistor 133. The variation in the voltages at the positive terminal E and the negative terminal F of the comparator 127 is shown on the fifth line of FIG. 6. The negative input F can assume only the values V and V/2, taking into account the ratings of the resistors 128 and 133.

The correction signal C, obtained at the output of the logic circuit 108, is illustrated on the last line of FIG. 6. By way of the resistor 110a, the signal C is passed to the non-earthed terminal of the capacitor 111. Similarly, the signal A is passed, by way of the resistor 110b, to the same terminal of the capacitor 111. The unit constituted by the elements 110a, 110b and 111 forms the integrator 102. If a voltage RS corresponding to a required retardation is applied to the negative input of the comparator $C_1$ by way of the resistor 140, and if the effective retardation rises above the required value, the correction signal C has a diminishing integral and, consequently, the signal I has a diminishing means value. Comparison of I with the voltage RS thus causes the comparator $C_1$ to output at an earlier stage, and this corresponds closely to a reduction in the effective retardation so as to bring it to the required value.

As in the case of the first variant, it will be seen that this device enables ignition to be retarded independently of the speed of rotation as soon as a voltage level corresponding to the required retardation is established at the negative input of the comparator $C_1$. The loop system achieved by means of the correction signal enables the effective retardation to be made equal to the required retardation irrespective of the constructional features of the ignition means and the magnetic pick-up.

It will of course be understood that the above-described embodiments are in no way limiting and could be modified in any desirable manner without departing from the framework of the invention.

What is claimed is:

1. In an ignition device for use, in particular with the internal combustion engines of motor vehicles and comprising at least one ignition coil switch and a magnetic pick-up which produces a periodical alternating signal A and is associated with an integrator circuit which possesses said alternating signal, the output signal I of said integrator circuit being fed to an input of a comparator $C_1$ the other input of which receives a signal defining a threshold, and the output of said comparator being used to actuate the ignition coil switch: the improvement comprising:

a logic circuit combining the signal Z furnished by a zero detector indicating that said signal A from said pick-up has reached a value of approximately zero with the output signal of said comparator, the output from said logic circuit being passed to an integrator to provide a signal R which constitutes a measure of the actual ignition displacement achieved, the result of the comparison of the signal R with a signal RS which represents the required ignition displacement causing said switch to be actuated.

2. A device according to claim 1, in which an amplifying comparator $C_2$ receives, on the one hand, the signal R and, on the other hand, the voltage RS representing the ignition displacement desired for providing a correction signal C defining said threshold.

3. A device according to claim 1, in which the signal defining said threshold is the voltage RS representing the required ignition displacement, the signal R being combined with the signal I.

4. A device according to claim 1, in which the signal Z is combined with the signal Z is combined with the signal I for supply to an input of said comparator $C_1$.

5. A device according to claim 1, in which the signal Z is combined with the signal defining a threshold for supplying an input of said comparator $C_1$.

6. A device according to claim 2, in which the signal Z is combined with the signal I by means of a direct-coupled diode to supply the positive input of the comparator $C_1$, the negative input receiving the correction signal C, and the logic circuit being of the "exclusive OR" type.

7. A device according to claim 3, in which the signal Z is combined with the signal defining a threshold, which is a function of the required ignition displacement, by way of an inversely-coupled diode, for supplying the negative input of the comparator $C_1$, the positive input receiving the signal I and the signal R, and the logic circuit being of the 37 NCT AND" type.

8. A device according to claim 3, in which the integrator providing the signal I and the integrator providing the signal R are one and the same.

9. A device according to claim 7, in which the integrator providing the signal I and the integrator providing the signal R are one and the same.

* * * * *